(12) United States Patent
Blankenburg et al.

(10) Patent No.: US 10,093,589 B2
(45) Date of Patent: Oct. 9, 2018

(54) STABLE FERTILIZERS INCLUDING HUMECTANT

(71) Applicants: Dean Blankenburg, West Bend, WI (US); Eric M. Johnson, West Allis, WI (US); Charles A. Krier, Brookfield, WI (US)

(72) Inventors: Dean Blankenburg, West Bend, WI (US); Eric M. Johnson, West Allis, WI (US); Charles A. Krier, Brookfield, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 0 days.

(21) Appl. No.: 15/051,330

(22) Filed: Feb. 23, 2016

(65) Prior Publication Data

US 2017/0240481 A1    Aug. 24, 2017

(51) Int. Cl.
C05C 9/00 (2006.01)
C05G 3/00 (2006.01)
C05B 17/00 (2006.01)

(52) U.S. Cl.
CPC ............ *C05G 3/0005* (2013.01); *C05B 17/00* (2013.01); *C05C 9/00* (2013.01)

(58) Field of Classification Search
CPC .......... C05G 3/0005; C05B 17/00; C05C 9/00
See application file for complete search history.

(56) References Cited

U.S. PATENT DOCUMENTS

| | | | |
|---|---|---|---|
| 3,419,379 A * | 12/1968 | Goodale | C05C 1/02 252/381 |
| 5,346,704 A * | 9/1994 | Lajoie | A01N 25/26 424/407 |
| 5,939,357 A * | 8/1999 | Jones | A01N 59/04 424/600 |
| 6,518,240 B1 | 2/2003 | Pedersen et al. | |
| 8,419,810 B2 * | 4/2013 | Hillion | C10L 1/026 44/308 |
| 8,822,737 B2 | 9/2014 | Houseman et al. | |
| 2006/0084573 A1 | 4/2006 | Grech et al. | |
| 2014/0357486 A1 | 12/2014 | Akers | |

FOREIGN PATENT DOCUMENTS

| | | |
|---|---|---|
| CA | 2927014 A1 | 5/2015 |
| CN | 103360152 A | 10/2013 |
| CN | 105330492 A | 2/2016 |

OTHER PUBLICATIONS

J. Jifon et al., Effect of Foliar Potassium Fertilization and Source on Cantaloupe Yield and Quality, 95 Better Crops, No. 1, 13-15, 2011.
J. Hart et al., Foliar Nutrient Application to Grass Grown for Seed, 18 Crop and Soil News/Notes, No. 2, 1-4 (Mar. 2014).
Foliar Nutrition, Midwest Laboratories, Copyright 1994.

* cited by examiner

*Primary Examiner* — Jennifer A Smith
(74) *Attorney, Agent, or Firm* — Quarles & Brady LLP

(57) ABSTRACT

Disclosed is a stable fertilizer composition including: a sulfur-containing compound; and a reaction product of a potassium-containing compound and a humectant selected from the group consisting of polyhydric alcohols, esters of polyhydric alcohols, polyalkylene glycols, and hydroxylated carboxylic acids. One version of the fertilizer composition also includes a nitrogen-containing compound; a phosphorous-containing compound; and at least one more additional macronutrient or micronutrient. The macronutrient may be selected from the group consisting of calcium and magnesium, and the micronutrient may be selected from the group consisting of zinc, manganese, iron, copper, calcium, magnesium, cobalt, boron, nickel, and molybdenum. The fertilizer composition may be essentially free of chelated metals and chelated metal salts. Methods of using a solution of the fertilizer composition for supplying plant nutrients to a plant are also disclosed.

12 Claims, No Drawings

STABLE FERTILIZERS INCLUDING HUMECTANT

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The invention relates to fertilizer compositions comprising a sulfur-containing compound, and a reaction product of a potassium-containing compound and a humectant. Methods of using a solution of the fertilizer composition for supplying plant nutrients to a plant are also disclosed.

2. Description of the Related Art

New technology in the agricultural market is pushing crop yields higher and higher. The advancements in crop genetics, precision farming practices, and detailed field data are allowing commercial crop growers to push their fields to new limits. However, these advancements are not without limitations, because as yield rate increases, more and more nutrients are extracted from the soil, forcing growers to find new and improved methods to continuously provide and have available the correct levels of vital nutrients to the plants throughout the entire growth cycle. Unfortunately, there is limit to the amount of nutrients that can be applied to croplands by conventional methods without the fear of harming the crop, polluting waterways, or exorbitant spending.

Various elements, which are normally drawn from the soil, are known to be essential to plant nutrition. These elements include: nitrogen (N), phosphorus (P), potassium (K), sulfur (S), calcium (Ca), magnesium (Mg), iron (Fe), manganese (Mn), copper (Cu), cobalt (Co), zinc (Zn), boron (B), nickel (Ni), molybdenum (Mo), and chlorine (Cl). Of these elements, nitrogen, phosphorus, potassium, sulfur, calcium, and magnesium are needed by plants in relatively large quantities and are therefore called macronutrients. The remaining members of the group (iron, manganese, copper, cobalt, zinc, boron, nickel, molybdenum, and chlorine) are known as micronutrients since they are required in very small amounts for plant growth.

Supplying a plant's major nutrient needs (nitrogen, phosphorus, potassium—N—P—K) is most effective and economical via soil application. However, foliar application has proven to be an excellent method of supplying plant requirements for secondary macronutrients (sulfur, calcium, magnesium) and micronutrients, while supplementing N—P—K needs for short and/or critical growth stage periods. Foliar application refers to the application of plant nutrients to above-ground plant parts. Foliar fertilization programs prolong the fertilizing application period, providing a continuous supply of nutrients when crop demand is at a maximum, and can be an economical way to boost yield.

In fertilization programs, sulfate metal salts (e.g., zinc sulfate, manganese sulfate, and copper sulfate) are an economical source affording both sulfur and micronutrients. These sulfate salts are readily soluble in aqueous solutions and can be applied either in a dry or liquid form. The simple chemical structure as well as the metal being non-chelated combines for quick and easy plant uptake of the metal cation and sulfate anion. However, aqueous solutions need to have a pH below approximately 3 to prevent the formation of metal oxide precipitates; also, dry material is challenging to apply foliarly.

Humectants have also been used to help retain water within the soil and plant tissue. These features make the incorporation of a humectant into a foliar fertilizer potentially beneficial to the needs of the plant.

Potassium deficiency is typically seen in the later stages of plant development as the available soluble potash near the root zone is depleted and translocated into the new foliage. Thus, getting potassium to crops during the high demand growth stages is essential to reaching the maximum yield potential. Potassium is usually applied as potassium chloride, potassium hydroxide, and/or potassium phosphate. However, these potassium compounds are ineffective when used in a foliar fertilizer program. Most potassium salts will cause chlorosis of the leaf tissue, thereby harming the plants development, reducing the yield potential, or causing death. When these potassium salts are combined with non-chelated metal sulfates and humectants, they become unstable and form insoluble precipitates. Using chelated metal salts, such as zinc ethylenediaminetetraacetate, does improve stability and solubility; however, many chelating agents have a molecular size too large to be effectively absorbed by leaf tissue. To the extent that chelating agents can be absorbed by leaf tissue, the delayed release and slow uptake of chelated metal into the plant cells is not desired in foliar applications, especially during high demand growth stages.

Due to the incompatibility of potassium salts and non-chelated metals, the current practice for applying potassium, sulfur, and micronutrients during the high demand vegetative and flowering stages requires: (i) multiple applications applying both sulfur and micronutrients and potassium salts separately, or (ii) using a single application of potassium salts and chelated metal salts where at best slow uptake of the chelated metal into the plant cells is expected.

Thus, there is a need for stable fertilizer compositions that include a source of potassium, a source of sulfur, and additional macronutrients and/or micronutrients, and that do not require the use of chelated metals or chelated metal salts, and that will not form insoluble precipitates.

SUMMARY OF THE INVENTION

The present disclosure addresses the foregoing needs by providing stable fertilizer compositions. These stable fertilizer compositions do not require the use of chelated metals or chelated metal salts, and will not form insoluble precipitates at a pH of 7 or below.

One embodiment of the invention is a stable fertilizer composition comprising a sulfur-containing compound; and a reaction product of a potassium-containing compound and a humectant selected from the group consisting of polyhydric alcohols, esters of polyhydric alcohols, polyalkylene glycols, and hydroxylated carboxylic acids.

Another embodiment of the invention is a stable fertilizer composition comprising: a nitrogen-containing compound; a phosphorous-containing compound; a reaction product of a potassium-containing compound and a humectant selected from the group consisting of polyhydric alcohols, esters of polyhydric alcohols, polyalkylene glycols, and hydroxylated carboxylic acids; a sulfur-containing compound; and at least one more additional macronutrient or micronutrient. The macronutrient may be selected from the group consisting of calcium and magnesium, and the micronutrient may be selected from the group consisting of zinc, manganese, iron, copper, calcium, magnesium, cobalt, boron, nickel, and molybdenum. The fertilizer composition may be essentially free of chelated metals and chelated metal salts.

The invention also provides a method for supplying plant nutrients to a plant. The method includes the step of applying to an above-ground part (e.g., leaves) of the plant an amount of a solution of the fertilizer composition in accordance with any of the embodiments of the invention, wherein the amount of the fertilizer composition is effective to improve plant growth.

These and other features, aspects, and advantages of the present invention will become better understood upon consideration of the following detailed description and appended claims.

DETAILED DESCRIPTION OF THE INVENTION

The compositions and methods of the present invention provide stable fertilizers and methods of using a fertilizer. As used herein, fertilizer means any material of natural or synthetic origin that is added to a soil and/or to an above-ground part of the plant to supply one or more plant nutrients essential to the growth of plants. A fertilizer may provide one or more of the following plant nutrients: nitrogen (N), phosphorus (P), potassium (K), sulfur (S), calcium (Ca), magnesium (Mg), iron (Fe), manganese (Mn), copper (Cu), cobalt (Co), zinc (Zn), boron (B), nickel (Ni), molybdenum (Mo), and chlorine (CI) in elemental form or as an ion of the element.

A fertilizer composition of the invention may be a fertilizer concentrate or a ready-to-use fertilizer. A fertilizer concentrate can be liquid or solid. A ready-to-use fertilizer may be formed by adding a diluent to the fertilizer concentrate to increase the volume of the fertilizer composition. An example diluent is water. A ready-to-use fertilizer, at a minimum, does not scorch leaves after application to a plant. In example embodiments, the ready-to-use fertilizer is an aqueous solution with 5 wt. % or less dissolved plant nutrients, or an aqueous solution with 4 wt. % or less dissolved plant nutrients, or an aqueous solution with 2 wt. % or less dissolved plant nutrients, or an aqueous solution with 1 wt. % or less dissolved plant nutrients.

By stable, we mean the fertilizer does not undergo phase separation at an ambient temperature in which the fertilizer is used, transported, and/or stored. A typical ambient temperature in which the fertilizer is used, transported, and/or stored is any temperature in the range of 30° F. to 120° F. (−1° C. to 49° C.). In the present specification, wt. % means weight percent wherein all weight percentages are percent by weight of the total composition.

One non-limiting embodiment of the invention is a stable fertilizer composition comprising a sulfur-containing compound; and a reaction product of a potassium-containing compound and a humectant. The fertilizer composition will not form insoluble precipitates at a pH less than or equal to 7, or at a pH less than or equal to 6, or at a pH less than or equal to 5, or at a pH less than or equal to 4, or at a pH less than or equal to 3, or at a pH less than or equal to 2.

The sulfur-containing compound of the fertilizer composition may be selected from sulfates, sulfides, sulfites, and organosulfur compounds. In one embodiment of the fertilizer composition, the sulfur-containing compound is a sulfate salt of a metal selected from the group consisting of zinc, manganese, iron, copper, calcium, and magnesium. Preferably, the sulfur-containing compound is non-chelated.

More than one sulfur-containing compound may be used in the fertilizer composition. Sulfur may be present in the fertilizer composition in an amount ranging up to 10 wt. %, or in a range of 0.1 wt. % to 5 wt. %, or in a range of 1 wt. % to 5 wt. %, or in a range of 2 wt. % to 4 wt. %, wherein all weight percentages are percent by weight of the total composition.

The fertilizer composition includes a reaction product of a potassium-containing compound and one or more humectants. The potassium-containing compound may be potassium hydroxide. The humectant may be any material that attracts and/or retains moisture on the leaf when it is applied to the leaf. Suitable humectants are hygroscopic materials including, but not limited to: (i) polyhydric alcohols, such as ethylene glycol, propylene glycols, butylene glycols, and sugar alcohols (e.g., glycerol, erythritol, threitol, arabitol, xylitol, ribitol, mannitol, sorbitol, galactitol); (ii) esters of polyhydric alcohols (e.g., sugar alcohol esters such as glycerol esters); (iii) polyalkylene glycols such as polyethylene glycols, polypropylene glycols and ethylene oxide/propylene oxide copolymers; and (iv) hydroxylated carboxylic acids such as glycolic acid (2-hydroxyethanoic acid), citric acid (3-carboxy-3-hydroxypentane-1,5-dioic acid), lactic acid (2-Hydroxypropanoic acid), and tartaric acid (2,3-dihydroxybutanedioic acid). Without intending to be bound by theory, it is believed that a potassium cation replaces the hydrogen of one or more of the hydroxyl groups of the humectants. In one non-limiting example embodiment, the reaction product is potassium glyceroxide. Potassium is present in the fertilizer composition in an amount ranging up to 20 wt. %, or in a range of 0.1 wt. % to 15 wt. %, or in a range of 1 wt. % to 10 wt. %, or in a range of 2 wt. % to 8 wt. %, wherein the amount of potassium is measured as an equivalent to soluble potash ($K_2O$), wherein all weight percentages are percent by weight of the total composition.

Other embodiments of the invention are stable fertilizer compositions comprising a sulfur-containing compound; a reaction product of a potassium-containing compound and a humectant; and one or more additional plant nutrients selected from macronutrients and micronutrients.

The fertilizer composition may include nitrogen as a plant nutrient. Various nitrogen-containing compounds may provide the nitrogen in the fertilizer composition. In an example embodiment, the nitrogen-containing compound is selected from urea, urea ammonium nitrate, and ammonium salts. Nitrogen may be present in the fertilizer composition in an amount ranging up to 20 wt. %, or in a range of 0.1 wt. % to 15 wt. %, or in a range of 1 wt. % to 10 wt. %, or in a range of 2 wt. % to 8 wt. %, wherein the amount of nitrogen is measured as total nitrogen, wherein all weight percentages are percent by weight of the total composition.

The fertilizer composition may include phosphorus as a plant nutrient. Various phosphorus-containing compounds may provide the phosphorus in the fertilizer composition. For example, the phosphorous-containing compound may be a phosphate salt such as ammonium phosphate or calcium phosphate. Phosphorus may be present in the fertilizer composition in an amount ranging up to 20 wt. %, or in a range of 0.1 wt. % to 15 wt. %, or in a range of 1 wt. % to 10 wt. %, or in a range of 2 wt. % to 8 wt. %, wherein the amount of phosphorus is measured as an equivalent to available phosphate ($P_2O_5$), wherein all weight percentages are percent by weight of the total composition.

The fertilizer composition may include as a plant nutrient one or more plant nutrients selected from macronutrients, such as calcium and magnesium, and micronutrients, such as zinc, manganese, iron, copper, calcium, magnesium, cobalt, boron, nickel, and molybdenum. The micronutrient can be provided in the fertilizer by incorporation of an acid salt having the plant nutrient metal ion. Sulfates, nitrates and chlorides of the plant nutrient metal ion may be useful as the source of the plant nutrient metal ion. Disodium octaborate tetrahydrate is useful as a source of boron. Each of the plant nutrients may be present in the fertilizer composition in an amount ranging up to 10 wt. %, or in a range of 0.1 wt. % to 5 wt. %, or in a range of 1 wt. % to 4 wt. %, wherein all weight percentages are percent by weight of the total composition.

A fertilizer composition of the invention may include other additives such as adjuvants, antifoam agents, antimicrobial agents, buffering agents, corrosion inhibitors, defoaming agents, deposition agents, dyes, penetration aids, spray drift control agents, spreading agents, stabilizers, sticking agents, surfactants, suspension aids, viscosity-modifying additives, wetting agents and the like.

Conventional equipment can be used for the application of the fertilizer composition of this invention. Application is ordinarily accomplished by spraying on an above-ground part of the plant and/or soil.

Most unexpectedly and novel, the addition of a potassium salt synthesized from the reaction of potassium hydroxide and a humectant results in a stable nitrogen, potassium, sulfur, and micronutrient fertilizer. The potassium humectant salt is readily soluble in aqueous solutions. When combined with metal sulfates at pH 2, the potassium humectant salt remains stable and does not cause metal oxides to form. In contrast, other potassium salts either form salts in aqueous solutions at pH 2 or increase the pH causing the metal ions to form oxide precipitates.

Table 1 shows various non-limiting examples of a fertilizer composition according to the invention. Composition 1 can be prepared to have the disclosed nutrient analysis and pH of 2 using: (i) urea as the source of nitrogen; (ii) potassium glyceroxide as the source of potassium which is measured as an equivalent to soluble potash ($K_2O$); (iii) zinc sulfate and manganese sulfate as the sources of sulfur, zinc and manganese; and (iv) disodium octaborate tetrahydrate as the source of boron. Composition 2 can be prepared to have the disclosed nutrient analysis and pH of 2 using: (i) urea as the source of nitrogen; (ii) potassium glyceroxide as the source of potassium which is measured as an equivalent to soluble potash ($K_2O$); (iii) zinc sulfate, manganese sulfate and iron sulfate as the sources of sulfur, zinc, manganese and iron; and (iv) disodium octaborate tetrahydrate as the source of boron. Composition 3 can be prepared to have the disclosed nutrient analysis and pH of 2 using: (i) urea as the source of nitrogen; (ii) potassium glyceroxide as the source of potassium which is measured as an equivalent to soluble potash ($K_2O$); (iii) zinc sulfate and manganese sulfate as the sources of sulfur, zinc and manganese; and (iv) disodium octaborate tetrahydrate as the source of boron. Composition 4 can be prepared to have the disclosed nutrient analysis and pH of 2 using: (i) urea as the source of nitrogen; (ii) potassium glyceroxide as the source of potassium which is measured as an equivalent to soluble potash ($K_2O$); (iii) zinc sulfate, manganese sulfate and iron sulfate as the sources of sulfur, zinc, manganese and iron; and (iv) disodium octaborate tetrahydrate as the source of boron.

TABLE 1

Various Foliar Fertilizer Nutrient Analysis

| | wt % N | wt % $K_2O$ | wt % S | wt % Zn | wt % Mn | wt % Fe | wt % B |
|---|---|---|---|---|---|---|---|
| Composition 1 | 4.0 | 1.5 | 3.0 | 3.0 | 3.0 | — | 0.25 |
| Composition 2 | 4.0 | 1.5 | 3.0 | 2.0 | 2.0 | 1.0 | 0.25 |
| Composition 3 | 6.0 | 1.5 | 3.0 | 3.0 | 3.0 | — | 0.25 |
| Composition 4 | 6.0 | 1.5 | 3.0 | 2.0 | 2.0 | 1.0 | 0.25 |

Fertilizers of these compositions can provide the macronutrients and micronutrients—along with the benefits of a humectant—in an effective, readily available form to increase plant health, growth, and yields when nutrient demands are at their highest.

The following Example has been presented in order to further illustrate the invention and is not intended to limit the invention in any way.

EXAMPLE 1

A fertilizer composition was prepared as follows. Into a 1000 mL vessel was charged 542 grams potable water and 65 grams citric acid anhydrous while agitating. After dissociation of the citric acid, 95 grams manganese sulfate monohydrate, 85 grams zinc sulfate monohydrate, 12.2 grams disodium octaborate tetrahydrate, and 86 grams prilled urea were charged. Again after dissociation of all salts, 120 grams potassium glyceroxide was added, yielding an analysis of 4 wt. % N, 3 wt. % S, 3 wt. % Zn, 3 wt. % Mn, and 0.25 wt. % B. The pH was 2.5 at 25° C. (77° F.). The composition was free of precipitates.

Thus, the invention provides a stable fertilizer composition comprising one or more sulfur-containing compounds; and a reaction product of a potassium-containing compound and a humectant selected from the group consisting of polyhydric alcohols, esters of polyhydric alcohols, polyalkylene glycols, and hydroxylated carboxylic acids. The stable fertilizer composition may further include: a nitrogen-containing compound; a phosphorous-containing compound; and one or more additional macronutrients or micronutrients.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:
1. A stable fertilizer composition comprising:
   a nitrogen-containing compound;
   a phosphorous-containing compound;
   potassium glyceroxide;
   a sulfur-containing compound; and
   at least one of an additional macronutrient or a micronutrient,
      wherein the macronutrient is selected from the group consisting of calcium and magnesium, and
      wherein the micronutrient is selected from the group consisting of zinc, manganese, iron, copper, calcium, magnesium, cobalt, boron, nickel, and molybdenum,
   wherein the fertilizer composition is essentially free of chelated metals and chelated metal salts.

2. The fertilizer composition of claim 1 wherein:
the fertilizer is stable at a pH of 7 or below.

3. The fertilizer composition of claim 1 wherein:
potassium is present in the fertilizer composition in an amount ranging up to 20 wt. %, wherein the amount of potassium is measured as an equivalent to soluble potash ($K_2O$), wherein all weight percentages are percent by weight of the total composition.

4. The fertilizer composition of claim 1 wherein:
the nitrogen-containing compound is selected from urea, urea ammonium nitrate, and ammonium salts.

5. The fertilizer composition of claim 1 wherein:
nitrogen is present in the fertilizer composition in an amount ranging up to 20 wt. %, wherein the amount of nitrogen is measured as total nitrogen, wherein all weight percentages are percent by weight of the total composition.

6. The fertilizer composition of claim 1 wherein:
the phosphorous-containing compound is a phosphate salt.

7. The fertilizer composition of claim 1 wherein:
phosphorus is present in the fertilizer composition in an amount ranging up to 20 wt. %, wherein the amount of phosphorous measured as an equivalent to available phosphate ($P_2O_5$), wherein all weight percentages are percent by weight of the total composition.

8. The fertilizer composition of claim 1 wherein:
the sulfur-containing compound is a sulfate salt of a metal selected from the group consisting of zinc, manganese, iron, copper, calcium, and magnesium.

9. The fertilizer composition of claim 8 wherein:
the sulfur-containing compound is non-chelated and sulfur is present in the fertilizer composition in an amount ranging up to 10 wt. %, wherein all weight percentages are percent by weight of the total composition.

10. The fertilizer composition of claim 1 wherein:
the micronutrient is provided by an acid salt having a metal ion selected from the group consisting of zinc, manganese, iron, copper, calcium, magnesium, cobalt, nickel, and molybdenum.

11. The fertilizer composition of claim 1 wherein:
nitrogen is present in the fertilizer composition in an amount ranging up to 20 wt. %, wherein the amount of nitrogen is measured as total nitrogen,
phosphorus is present in the fertilizer composition in an amount ranging up to 20 wt. %, wherein the amount of phosphorous is measured as an equivalent to available phosphate ($P_2O_5$),
potassium is present in the fertilizer composition in an amount ranging up to 20 wt. %, wherein the amount of potassium is measured as an equivalent to soluble potash ($K_2O$), and
sulfur is present in the fertilizer composition in an amount ranging up to 10 wt. %, and
all weight percentages are percent by weight of the total composition.

12. A method for supplying plant nutrients to a plant, the method comprising:
applying to an above-ground part of the plant an amount of a solution of the fertilizer composition of claim 1, the amount being effective to improve plant growth.

\* \* \* \* \*